(12) United States Patent
Heeg et al.

(10) Patent No.: US 8,870,288 B2
(45) Date of Patent: Oct. 28, 2014

(54) LOCKING APPARATUS FOR A VEHICLE SEAT

(75) Inventors: Norbert Heeg, Dahn (DE); Andreas Diehl, Otterberg (DE); Peter Müller, Mackenbach (DE)

(73) Assignee: Johnson Controls Components GmbH & Co. KG., Kaiserslautern (DE)

( * ) Notice: Subject to any disclaimer, the term of this patent is extended or adjusted under 35 U.S.C. 154(b) by 162 days.

(21) Appl. No.: 13/263,387

(22) PCT Filed: Apr. 8, 2010

(86) PCT No.: PCT/EP2010/002198
§ 371 (c)(1),
(2), (4) Date: Jan. 3, 2012

(87) PCT Pub. No.: WO2010/115626
PCT Pub. Date: Oct. 14, 2010

(65) Prior Publication Data
US 2012/0093580 A1      Apr. 19, 2012

(30) Foreign Application Priority Data
Apr. 9, 2009 (DE) .......................... 10 2009 017 627

(51) Int. Cl.
*B60N 2/02* (2006.01)
*B60N 2/44* (2006.01)
*B60N 2/36* (2006.01)

(52) U.S. Cl.
CPC .............. *B60N 2/366* (2013.01); *B60N 2/0252* (2013.01); *B60N 2/4435* (2013.01); *B60N 2/0232* (2013.01)

USPC ....................................................... 297/378.13

(58) Field of Classification Search
USPC ......................................... 297/378.11, 378.13
See application file for complete search history.

(56) References Cited

U.S. PATENT DOCUMENTS

| | | | |
|---|---|---|---|
| 6,547,302 B1 * | 4/2003 | Rubio et al. ................ | 296/65.09 |
| 7,044,552 B2 * | 5/2006 | Muller et al. ................. | 297/336 |
| 7,152,926 B2 * | 12/2006 | Wrobel ..................... | 297/378.13 |
| 7,188,906 B2 * | 3/2007 | Christoffel et al. ...... | 297/378.13 |
| 7,338,128 B2 * | 3/2008 | Inoue et al. .............. | 297/378.13 |
| 7,377,584 B2 * | 5/2008 | Griswold et al. ........ | 297/216.12 |
| 7,416,254 B2 * | 8/2008 | Jennings ................... | 297/378.12 |
| 7,762,604 B1 * | 7/2010 | Lindsay ......................... | 296/64 |
| 8,118,342 B2 * | 2/2012 | Kokubo et al. ............ | 296/65.16 |
| 8,342,605 B2 * | 1/2013 | Tanaka et al. ............ | 297/378.13 |
| 2005/0023877 A1 * | 2/2005 | Vermeulen ............... | 297/378.13 |

(Continued)

FOREIGN PATENT DOCUMENTS

| | | |
|---|---|---|
| DE | 103177 C | 5/1899 |
| DE | 10304574 A1 | 8/2004 |

(Continued)

*Primary Examiner* — David R Dunn
*Assistant Examiner* — Alexander Harrison
(74) *Attorney, Agent, or Firm* — McGlew and Tuttle, P.C.

(57) ABSTRACT

A locking apparatus for a vehicle seat, particularly for a motor vehicle seat, includes a locking mechanism (23) for mechanically locking a moveable catch (31) of the locking mechanism (23) with a counter element (B), and an actuator device (24, 50) for actuating the catch (31) via a drive. A housing (20) is provided in which the locking mechanism (23) is arranged and housed. Improved safety against injuries of vehicle passengers that occur due to non-locked backseat backrests is provided with a motor-driven device for creating a lock of the locking mechanism (23).

20 Claims, 4 Drawing Sheets

(56) References Cited

U.S. PATENT DOCUMENTS

| | | | |
|---|---|---|---|
| 2007/0194615 A1* | 8/2007 | Fischer | 297/354.12 |
| 2009/0021067 A1* | 1/2009 | Griswold et al. | 297/378.13 |
| 2010/0052394 A1* | 3/2010 | Heeg et al. | 297/378.13 |
| 2011/0006576 A1* | 1/2011 | Muller et al. | 297/378.13 |
| 2011/0006577 A1* | 1/2011 | Muller et al. | 297/378.13 |

FOREIGN PATENT DOCUMENTS

| | | |
|---|---|---|
| DE | 10304574 B4 | 2/2005 |
| DE | 102004056086 B3 | 1/2006 |
| EP | 0854063 A2 | 7/1998 |
| WO | 03039905 A1 | 5/2003 |

* cited by examiner

LOCKING APPARATUS FOR A VEHICLE SEAT

CROSS REFERENCE TO RELATED APPLICATIONS

This application is a United States National Phase application of International Application PCT/EP2010/002198 and claims the benefit of priority under 35 U.S.C. §119 of German Patent Application DE 10 2009 017 627.6 filed Apr. 9, 2009, the entire contents of which are incorporated herein by reference.

FIELD OF THE INVENTION

The invention relates to a locking apparatus for a vehicle seat, particularly for a motor vehicle seat, comprising a locking mechanism for mechanically locking a moveable catch of the locking mechanism with a counter element, and comprising an actuator device for actuating the catch by means of a drive, and comprising a housing in which the locking mechanism is arranged and housed.

BACKGROUND OF THE INVENTION

In particular locking and unlocking components for backseat systems often have a manually operable locking and unlocking mechanism, by which a locking of a backseat backrest of the backseat system with a vehicle structure can be created and released. To increase the comfort, such backseat systems are being provided increasingly more often with an electrically driven actuator, by which an unlocking of the locking mechanism can also be triggered in a motor-driven manner. Generally here, already existing, purely mechanical locking components are additionally provided with an electrical actuation. By means of transmission elements, such as angles, levers, linkages, gears and suchlike, which are also fastened on the adapter plate, a coupling takes place between the actuator and the locking mechanism for the transmission of the drive movement of the actuator to the locking mechanism.

Backseat backrests of the second or third row of seats are generally able to be turned over, in order to make a greater loading volume possible. For this, the backseat backrests can be unlocked from the vehicle structure and turned over towards the front. The resetting generally takes place in the manner that the passenger straightens up the backrest manually and with a particular expenditure of force carries out the locking of the backrest in the vehicle structure. The required expenditure of force is necessary in order to overcome the cushion pressure and the adjusting forces of the catches within the locking apparatus. The completed locking of the backrest with the vehicle structure is currently displayed by an indicator. The indicator is mechanically coupled with the locking apparatus such that it indicates to the passenger the status of the locking apparatus as a function of the position of a mechanical element of the locking apparatus which is responsible for the locking. In such backseat backrests, however, under different circumstances it is possible that nevertheless a correct locking does not take place, for example due to carelessness of the user. In this case, the backseat system is nevertheless not locked, but able to be sat in. In the case of an accident (frontal impact), it can then occur that the backseat backrest can not fulfil the requirement of "protection from load" as a separation of the passenger compartment from the luggage compartment. Thereby, the passengers in the passenger compartment are in certain circumstances under considerable risk; severe injuries to the passengers can then be the result.

SUMMARY OF THE INVENTION

The invention is therefore based on the problem of creating a locking apparatus of the type mentioned in the introduction, by which an improved safety is enabled against injuries to vehicle passengers that occur due to non-locked backseat backrests.

This problem is solved in a locking apparatus of the type mentioned in the introduction in accordance with the invention by motor-driven means for creating a lock of the locking mechanism. Locking apparatuses with a motor drive in fact already exist. However, these are used exclusively for the unlocking of the catch from its counter element, usually a bolt. Within the framework of the invention, it has now been found that a motor-generated locking movement of the catch can contribute to a greater security to the effect that an intended locking is in fact completed. If the locking apparatus has a motor-driven actuating device for the motor-driven unlocking of the catch, basically the locking can take place with the same actuator device with which the motor-driven drive movement is also produced for the unlocking. In a preferred embodiment of the invention, however, for the production of a drive movement for a locking of the locking device a separate actuating device, in particular only associated with the locking function, can be provided.

The actuator device can be integrated into the locking apparatus and its housing. In addition, in the case of an electrically adjustable backrest, the drive of the backrest device can be used as the actuator device for the locking device. If an electric backrest inclination adjustment is present, this can undertake the function of the drive production for the locking. This can take place for example in that the backrest is adjusted in its inclination until the locking of the backrest into the (vehicle) structure has taken place. In this case, the locking takes place purely mechanically, the catch itself does not have its own, i.e. separate, drive associated with it. The force for overcoming the cushion pressure and the locking forces is produced here by the backrest adjustment drive. In this embodiment, the functionality of a driven locking can be achieved, without having to undertake the expenditure of an additional drive.

In a preferred embodiment of the invention, a sensor device can be provided, by which a lockable position of the backrest of the seat system is able to be detected. As a function of a position recognition of the backrest, an activation can take place of the motor-driven drive movement produced by the actuator device. For this purpose, a corresponding signal of the sensor device can be used, which on recognition of a particular backrest position and/or of a particular relative position between the catch and its counter-bolt generates a corresponding signal which is fed to a control, which thereupon triggers the actuator unit, in order to thereby carry out the locking of the catch of the locking apparatus with the counter element.

Also in the variant in which the drive of the backrest inclination is used for the locking, a sensor device can be provided and an exchange of information between the sensor device of the locking apparatus and the backrest inclination adjuster is advantageous in an analogous manner to the variant with a separate actuator device. In this preferred embodiment according to the invention, it is possible that the sensor system of the locking apparatus and its electronic evaluation unit undertakes at least partially the function of a control of the backrest drive and carries out a data exchange with the backrest drive. Through the data exchange, the drive of the backrest can remain switched on until the backrest has reached a locking position and/or a locking of the backrest has taken place by means of the locking apparatus.

To further increase the security for producing a locking, in a further preferred embodiment of the invention, the sensor device can also comprise means by which (relative) positions of components of the locking apparatus are detected by sensor and monitored during the locking. When the components reach their respective final position, this can be signalled by a corresponding signal of the sensor device to the control or to another evaluation device. The control interprets these signals and can switch off the actuator device on reaching of end positions of the monitored components, which corresponds to a completed locking between the catch and its counter element. In addition, means can be provided in particular for the visual display of the completed locking.

In a further preferred configuration of the invention, a visual display can be provided for the locking status of the locking apparatus which is determined by the sensor device. Hereby, a visual monitoring of the locking status is possible, whereby the security can be further increased. The visual display can be arranged on the locking apparatus itself or in the vicinity thereof. Likewise, it is possible to indicate the locking status visually and/or acoustically on an instrument panel of the vehicle, in particular, a locking which has not been completed, in the form of a warning signal. For this, a processing of the signal of the sensor device can take place through the control.

It is advantageous if the actuator device acts with its motor-driven movement directly onto the catch itself, in order to transfer the latter into a locking position. In addition, expediently at least one securing element should be present, by which the catch can be secured in its locking position against an unintentional opening. This makes it possible to construct a locking mechanism which is particularly reliable in operation. In addition, such a structural solution also facilitates arranging the actuator device outside a flux of force, which in the case of a crash acts on the locking mechanism. The actuator device itself therefore does not imperatively have to be designed for crash forces.

In further preferred embodiments of the invention, the actuator device can be provided with a gear, in particular with a spindle gear, by which a reduction of the motor-driven drive movement of the actuator device is able to be produced. A spindle gear is one of several possibilities, in order to convert a rotary drive movement of the motor into an at least substantially translatory movement. By means of such a preferred rectilinear movement, the actuator device can act on the locking mechanism in order to achieve a locking pivoting movement of the catch of the locking mechanism with the counter element. Preferably here, a stop of the actuator device can act on a carrier of the catch arranged at a distance from a rotation axis of the catch, in order to hereby achieve a pivoting movement of the catch.

In order to achieve an even greater reduction and hence to further increase the torque, in addition a second gear can be provided, in particular a planetary gear upstream of the spindle gear. Advantageously, on the output side the planetary gear and the electric motor of the actuator device can be constructed identically, for example in the form of identical gearwheels. Thereby it is possible in a particularly simple manner to form a system of locking apparatuses in which for example different gears or respectively a different number of gears can be provided depending on which torque is required. Furthermore, different electric motors can also be integrated hereby in a simple manner into the modular system.

To achieve the locking, the actuator device advantageously carries out a lifting movement. In order to return one or more elements carrying out the lifting movement of the actuator device, after completion of the locking, into a position again which they have occupied before the locking, the locking apparatus can be provided with a resetting element. The resetting element can be constructed here as an energy store, in particular as an energy store which is able to be charged with energy by the drive movement during locking. The stored energy can then be released and used subsequently for the resetting of the actuator device. In a favourable embodiment of the invention, the resetting element can be a spring element. Advantageously, the resetting element brings the stored energy into the actuator device for its resetting in the region of the gear of the actuator device.

Further preferred configurations of the invention will emerge from the claims, the description and the drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
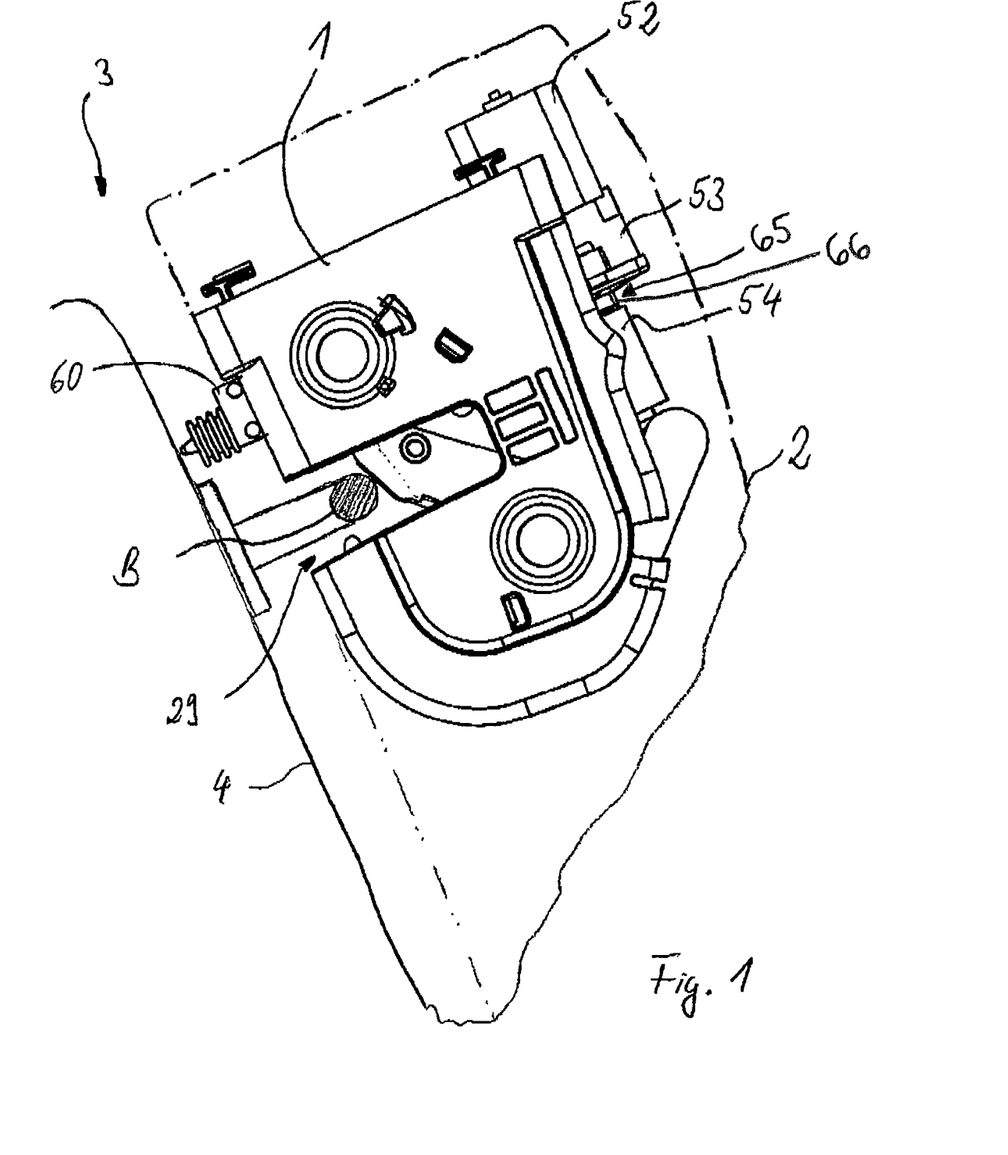
FIG. 1 is a cutout view of a backseat of a motor vehicle with a locking apparatus according to the invention and with a counter element fastened to a vehicle structure.

Referring to the drawings in particular, an example embodiment is shown for a locking apparatus 1 according to the invention, as can be integrated for example in a pivotably articulated backrest 2 of a backseat system 3. With such a locking apparatus 1, an upright position of the backrest 2 can be arrested or respectively secured by cooperation of the locking apparatus 1 with a counter element B. By means of a possibility, which is not illustrated, for the actuation of the locking apparatus 1, this arresting is releasable, for example in order to fold down the backseat backrest 2 in the direction of a seat surface, which is not illustrated, of the backseat system 3. The locking apparatus 1 can be integrated here into the backseat backrest 2, and the counter element B, for example a bolt, can be arranged fixed to the vehicle or respectively in a stationary manner on the vehicle structure 4. In principle, however, it is also possible to provide the counter element B on the backseat backrest 2 and the locking apparatus 1 on the vehicle structure 4. On pivoting movements of the backrest 2, the counter element B and a locking mechanism 23 of the locking apparatus move close to each other or respectively move apart from each other.

Figure 2:
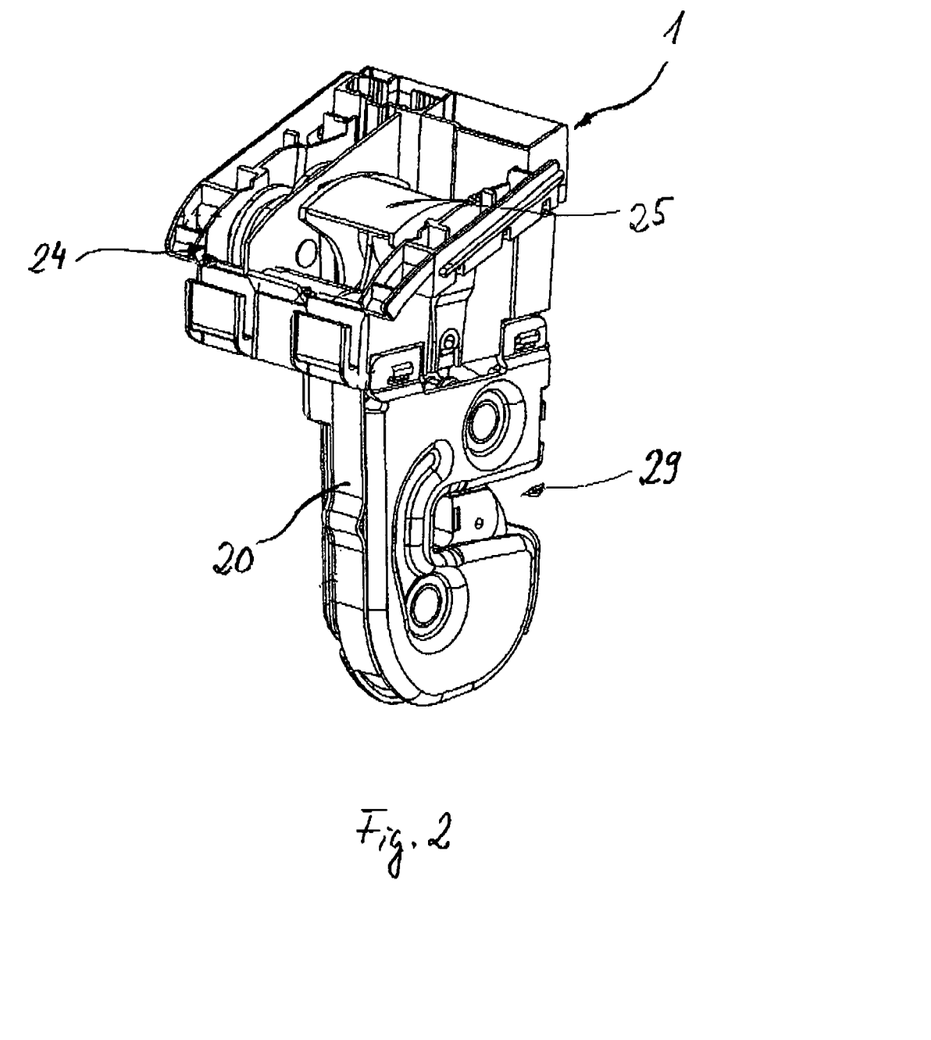
FIG. 2 is a perspective view of the locking apparatus of FIG. 1.

The locking apparatus 1 is provided with a multiple-part housing 20 (FIG. 2). In the latter a locking mechanism 23 known per se (cf. FIG. 3) is arranged and a first actuator unit 24 (FIG. 2), not illustrated more closely in detail, for an electrically generated drive movement of the locking mechanism for its unlocking, and mounted on the housing 20. In addition to the automated drive movement, the locking mechanism 23 can also be actuated manually with the aid of a pivotably articulated operating handle 25 (FIG. 2), in order to thereby cancel an arresting between the locking mechanism 23 and the counter element B. Embodiments are also possible in which no operating handle 25 is provided and the unlocking always takes place with the actuator unit 24. The locking mechanism 23 can be constructed in a manner known per se with regard to its mechanical components, their articulation and interactions with each other. Principles of such locking mechanisms are disclosed for example in DE 10 2004 056 086 B3, DE 103 04 574 B4 and DE 103 177 A1, the respective disclosure content of which is herewith included by reference. Therefore, the structure of the locking mechanism is only entered into in a rudimentary manner in the following.

Figure 3:
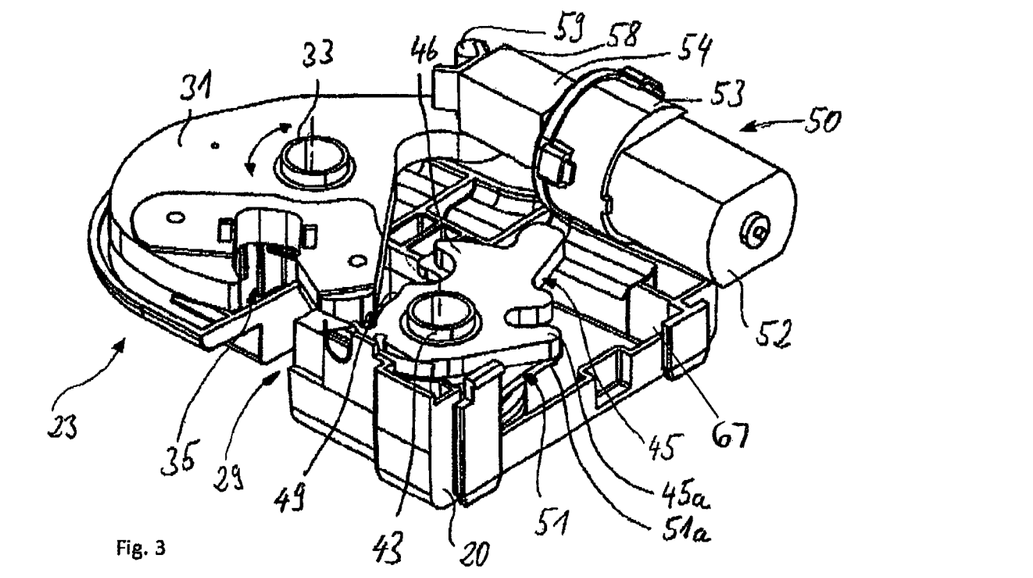
FIG. 3 is a partial perspective view of the locking mechanism of FIG. 2 in an unlocked position.
Figure 4:
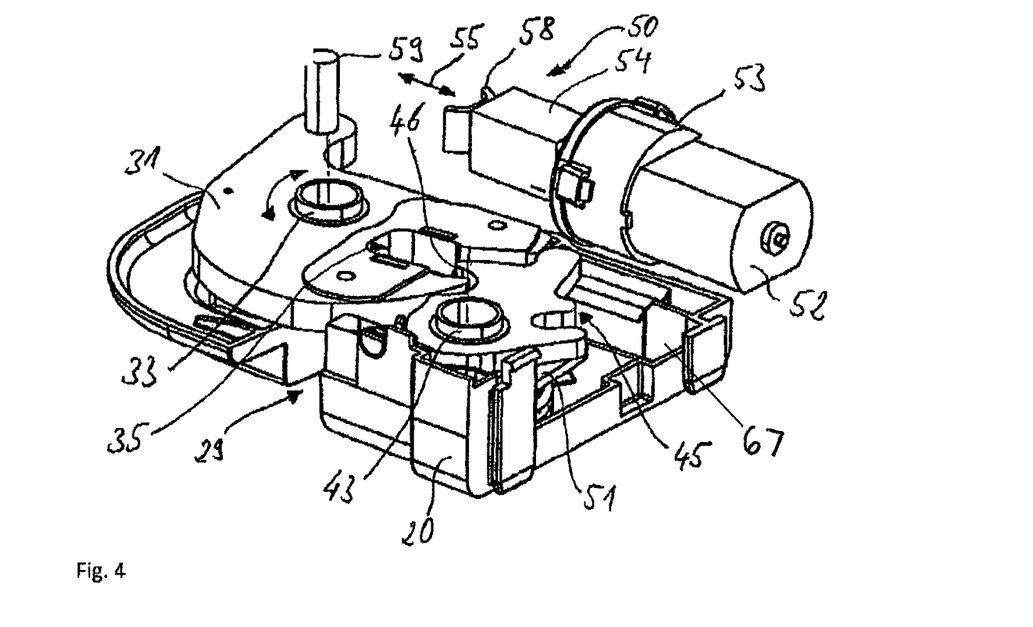
FIG. 4 is a partial perspective view of the locking mechanism of FIG. 2 in a locked position.

As is represented in FIGS. 3 and 4, a catch 31 of the locking mechanism 23 is pivotably mounted on a first bearing bolt 33, which in turn is arranged securely on and between two housing shells and hence on the housing 20. The catch 31 could, however, also be mounted movably in a different manner. For cooperating with the counter element B, the catch 31 has a groove-shaped hook jaw 35, which in a locked state of the locking apparatus 1 crosses at least approximately perpendicularly a mount 29 and surrounds the counter element B by three sides, whilst in an opened state it opens obliquely towards the mount 29. A second bearing bolt 43 is arranged parallel to the first bearing bolt 33 and is arranged in the same way as the latter on the housing. On the second bearing bolt 43, as first securing element, a catching eccentric 45 is pivotably mounted, which is prestressed towards the catch 31 by a spring, not represented in further detail, acting between the housing and the catching eccentric 45. The tensioning eccentric 51 is mounted as a second securing element alongside the catching eccentric 45 and likewise pivotably on the second bearing bolt 43. In the locked state, both the catching eccentric 45 and also the tensioning eccentric 51 have engaged into the catch, as is illustrated in FIG. 4. The tensioning eccentric 51 exerts a closing moment onto the catch 31 here by means of a clamping surface 49 which is curved eccentrically to the second bearing bolt 43.

In addition, the catching eccentric 45 in its closure position closes the hook jaw 46, which is open on one side, with a closing extension 46. For this purpose, the catching eccentric 45 has a catching surface, which is situated in the vicinity of the clamping surface 49 of the tensioning eccentric 51, but in the locked state does not imperatively have to be in contact with the catch 31. The catching surface of the catching eccentric 45 can be constructed as a surface curved centrically around the second bearing bolt 43. The catching eccentric 45 serves as security against unintentional opening from the locked state. In the case of a crash, when the catch 31 possibly undergoes an opening moment and presses the tensioning eccentric 51 away, the catching surface of the catching eccentric 45 arrives in abutment against the catch 31, without the catch 31 being able to exert a moment on the catching eccentric 45. The catching eccentric 45 therefore serves both for supporting the catch 31 and for preventing the opening thereof and also for load bearing in the case of a crash. The tensioning eccentric 51, which is for example prestressed with a spring, not illustrated, towards the catch 31, undertakes the function in the locked position that it exerts a closing moment onto the catch 31, whereby a position free of play and a tolerance compensation to the vehicle body is realized. Both securing elements, the catching eccentric 45 and also the tensioning eccentric 51, therefore secure the locked state of the catch 31.

Both from the catching eccentric 45 and also from the tensioning eccentric 51 respectively an arm, integrally formed onto the respective eccentric, projects in the form of an unlocking lever 45a, 51a for the unlocking of the locking device 1. By the moving of at least one of these unlocking levers 45a, 51a—in the illustration of FIGS. 3 and 4—, starting from the locked state in a clockwise direction, for example by means of a Bowden cable, the catching eccentric 45 and hence the catching surface pivots away from the catch 31. For example, by means of a carrier, which is not illustrated in further detail, the catching eccentric 45, if applicable after a short idle stroke, entrains the tensioning eccentric 51 and draws up the catch 31 by means of a tension spring which is not illustrated, so that it frees the counter element B. By suitable geometric relationships, the catching eccentric 45 and/or the tensioning eccentric 51, in the positions which they have taken up after the movements relative to the catch 31, exert an opening moment on the catch 31 or hold the latter opened otherwise. In this position, by a pivoting movement of the backseat backrest, the counter element B can now be guided through the relative movement of the locking apparatus 1 in relation to the counter element B out from the hook jaw 35 and hence the locking can be completely cancelled.

As is shown in FIGS. 3 and 4, the locking apparatus 1 has an actuator device 50 associated exclusively with the catch 31 for its locking, said actuator device being fastened on the housing 20. In the effective direction of the actuator device 50, the latter is provided with a direct current electric motor 52, which is functionally connected on the output side with an optionally provided planetary gear 53. In other embodiments of the invention a different type of gear can be provided or the gear can be dispensed with. Likewise, a motor could be provided as drive of the actuator device 50, which apart from the actuator device 50 also provides drive movements for other components. The planetary gear 53 in turn is functionally connected on the output side with a spindle gear 54, which in a manner known per se converts a rotary movement on the input side into a rectilinear movement on the output side. For this purpose, such a spindle gear has a spindle provided with a thread, and a spindle nut, arranged on the thread, which is driven by the planetary gear. With this rectilinear movement of the spindle, a fork-shaped stop 58 arranged on the spindle is moved to and fro in accordance with the arrow 55 in a straight line between two end regions. With the motor-generated forward movement, the stop 58 strikes onto a pin-shaped carrier 59, which is arranged on the catch 31 at a distance from the rotation axis of the catch 31 defined by the bearing bolt 33. With its lifting movement, the stop 58 receives and entrains the carrier between its forks, whereby a rotary movement of the catch 31 about the rotation axis of the bearing pin 33 is produced owing to a movement acting directly from the actuator device 50 onto the catch 31. In the illustration of FIG. 3, this rotary movement takes place in an anti-clockwise direction. With this rotary movement, carried out due to the stroke of the stop 58, the catch 31 engages the bolt B and locks with the latter.

Figure 5:
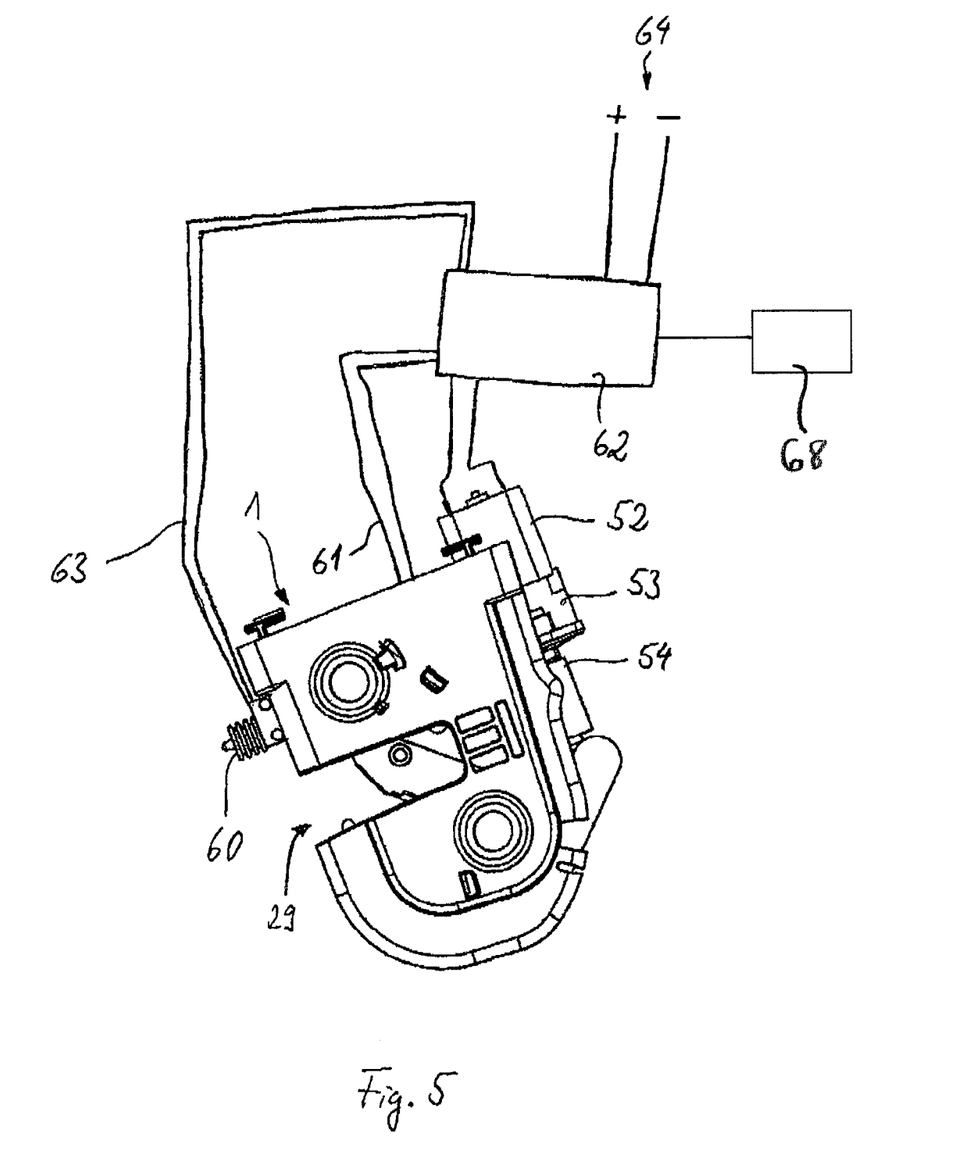
FIG. 5 is a partially schematic view of the locking apparatus according to the invention of FIG. 1 together with a control.

During this process, the position of one or of several components of the locking mechanism can be monitored by means of one or more sensors for the reaching of their end position, and on reaching of the end position a corresponding signal can be generated. In the embodiment which is shown, only the position of the catching eccentric 45 is determined by sensor 67. The at least one signal is fed to an electronic control 62. The control 62 interprets this signal and switches off the motor 52 of the actuator device 50 in the presence of predetermined conditions. In the example embodiment of FIGS. 3 and 4, for example a Hall sensor, not illustrated in further detail, fastened to the inner side of the housing 20, can be provided as sensor, by which a position of a magnet, likewise not illustrated, is detected, which can basically be fastened to the catching eccentric 45 or to the tensioning eccentric 51. With locking movements of the catch 31, without an engaging of the bolt B by the catch 31, the catching eccentric 45 reaches a different end position than with a correct locking between the catch 31 and the bolt B. This difference in the possible end position of the catching eccentric 45 can therefore serve as the basis for the information which is determined by sensor as to whether the backrest 2 is locked on the vehicle structure 4 or not. The Hall sensor therefore generates signals corresponding to this information, which is fed via lines 61 to the control 62 shown in FIG. 5. A display 68 is provided to display a locking final position. In a possible further development of the embodiment according to the invention which is shown, the position of the tensioning eccentric 51 can also be detected by sensor. This position information does not, however, enter into the information taken into consideration by a control 62 for the activation of the actuator device 50, but can be used to establish a faulty locking (misuse), i.e. a locking of the catch 31 without the bolt B being engaged.

The movement of the actuator device 50 is triggered by the backrest 2 arriving, from a folded down position, in its upright end position as locking position, as is represented in FIG. 1. In the example embodiment, a microswitch 60 is provided, preferably arranged externally on the locking apparatus 1, which is connected with the control 62 by means of lines 63. On reaching the lockable position, the microswitch 60 is triggered, owing to its contact with the vehicle structure 4, whereby a signal of the microswitch 60 for signalling the reaching of the lockable position of the backrest is fed to the control 62 shown in FIG. 5. This triggers a switching on of the motor 52 by the control 62, the drive movement of which pivots the catch 31 by means of the carrier 58, as already discussed. The signal of the Hall sensor is likewise fed to the control 62 and hence the motor 52 is switched off when the locking is completed. Differently from that illustrated in FIG. 5, the control 62 of the motor 52 can also be integrated into the locking apparatus 1. The control 62 is connected to a voltage supply 64 and on the basis of the sensor signals supplied to it determines the switching on and off of the motor 52. If applicable, the control can also undertake further functions, such as for example a voltage/current monitoring, which in the case of an overload switches off the motor independently of signals of the sensors for determining position.

The flux of force on the locked components runs from the counter element B via the catch 31 towards the tensioning eccentric 51, so that the actuator device 50 does not have to bear any loads such as e.g. crash loads.

In this embodiment, after the locking is completed, the stop 58 is reset again, so that it occupies the initial position again, shown in FIG. 3, but the catch 31 continues to be arranged in the position represented in FIG. 4. The spindle gear 54 can also be designed so that it is passively entrained with the opening catch 31 and in this way a resetting takes place. A resetting element 65 is provided for resetting the actuator device 50 into an initial position after a locking of the catch 31 has been completed. The resetting element 65 may be an energy store 66, which is able to be charged by a drive movement of the actuator device 50. Alternatively, as is the case in the example embodiment, after the switching off of the motor 52, a spring (e.g. spiral spring), which is not illustrated in further detail, can act on the actuator device 50 (motor, gear and/or spindle) such that hereby the stop 58 is actively drawn back again into its initial position. Thereby, on unlocking, no additional forces become necessary for overcoming retention forces of the actuator device 50, and the unlocking process can take place quickly and with less expenditure of force. For this purpose, the spring can be arranged for example between the planetary gear 53 and the spindle gear 54 and can be tensioned by the motor-driven locking movement. As soon as the motor 52 of the actuator device 50 is switched off, the spring can relax. As the motor 52 now no longer produces a force directed against a relaxing of the spring, and the torque introduced from the spring onto the spindle gear 54 exceeds the restoring torque of the actuator device 50, the spring now relaxes, which leads to a movement of the stop into its initial position, as shown in FIG. 3. The spring therefore turns the spindle gear 54 and the planetary gear 53 back into their positions which they had occupied before the production of the locking.

In other embodiments, a resetting of the actuator device 50 can also take place by a movement of the motor 52, the drive shaft of which, for this purpose, rotates in the opposite direction compared with the drive movement for the production of the locking.

In further possible embodiments of the invention, the actuator device 50 can use the rotation movement of an electric motor as such and without transformation into a rectilinear movement for action on the catch 31 in its closure movement. In this case, the motor can be coupled to the catch 31 such that its rotary movement is transferred to the catch 31 directly or via a gear which likewise provides a rotary movement on the output side. For example, provision can be made that the motor is arranged on the bearing bolt 33 and its rotary movement as such is transferred to the catch 31. In particular in connection with such solutions, electric motors with a particularly flat structural shape can be advantageous, as is the case for example in electronically commutated motors (ECM).

While specific embodiments of the invention have been described in detail to illustrate the application of the principles of the invention, it will be understood that the invention may be embodied otherwise without departing from such principles.

The invention claimed is:

1. A locking apparatus for a vehicle seat, particularly for a motor vehicle seat, the locking apparatus comprising:
   a locking mechanism for mechanically locking a moveable catch of the locking mechanism with a counter element, and comprising an actuator device for actuating the catch by means of a drive, and comprising a housing in which the locking mechanism is arranged and housed;
   a motor-driven means for creating a lock of the locking mechanism and a flux of force on the locked locking mechanism, by which the motor-driven means are load-free;
   a sensor device; and
   means by which position-dependent signals generated by the sensor device are able to be used for actuating the actuator device.

2. A locking apparatus according to claim 1, wherein said actuator device acts directly on the catch.

3. A locking apparatus according to claim 1, wherein at least one securing element for securing a locked position of the catch against opening.

4. A locking apparatus according to claim 3, wherein said securing element is constructed as a catching and/or tensioning eccentric.

5. A locking apparatus according to claim 1, wherein the flux of force of the locking mechanism with a load introduced via the counter element is such that the actuator device is free of the flux of force.

6. A locking apparatus according to claim 1, wherein said actuator device for actuating the catch by means of a drive comprises a first actuator device for the unlocking of the locking mechanism, and a second actuator device for the locking of the locking mechanism.

7. A locking apparatus according to claim 1, wherein said actuator device comprises a spindle gear and/or a planetary gear.

8. A locking apparatus according to claim 1, further comprising a stop able to be driven by the actuator device by means of a lifting movement and acting on the locking mechanism, which leads to a closing movement of the catch.

9. A locking apparatus according to claim 8, wherein the stop carries out an at least substantially rectilinear lifting movement and in so doing entrains a carrier which is functionally connected with the catch, and the carrier sets the catch into a rotary movement.

10. A locking apparatus according to claim 1, wherein said actuator device for the locking of the locking mechanism achieves a locking of the catch based on a rotary movement produced by the motor, without transformation of the rotary movement into a rectilinear movement.

11. A locking apparatus according to claim 1, further comprising a resetting element for resetting the actuator device into an initial position after a locking of the catch has been completed.

12. A locking apparatus according to claim 11, wherein the resetting element is arranged in a gear of the actuator device.

13. A locking apparatus according to claim 11, wherein the resetting element is constructed as an energy store which is able to be charged by a drive movement of the actuator device.

14. A locking apparatus according to claim 1, wherein said motor-driven means comprises a drive of a backrest inclination adjusting device.

15. A locking apparatus according to claim 1, wherein the sensor device is provided with means through which signals are able to be generated as a function of at least one position of components of the locking mechanism and/or of a backrest of the vehicle seat.

16. A locking apparatus according to claim 1, wherein the flux of force of the locking mechanism with a load introduced via the counter element, in which the actuator device is free of the flux of force the catch or the counter element are arranged in a pivotable backseat backrest and the respectively other of the two elements are arranged fixed to the vehicle on a vehicle structure.

17. A locking apparatus according to claim 15, further comprising a detection means of the sensor device for detecting a locking final position of the catch.

18. A locking apparatus according to claim 16, further comprising a display means, by means of which a locking final position, recognized by the detection means, is able to be displayed.

19. A locking apparatus according to claim 1, further comprising means for feeding signals of the detection means to a control of the actuator device.

20. A locking apparatus according to claim 16, further comprising a detection means of the sensor device for detecting a locking final position of the catch.

\* \* \* \* \*